(12) United States Patent
Wittenbach et al.

(10) Patent No.: US 11,790,369 B2
(45) Date of Patent: Oct. 17, 2023

(54) SYSTEMS AND METHOD FOR ENHANCED ACTIVE MACHINE LEARNING THROUGH PROCESSING OF PARTITIONED UNCERTAINTY

(71) Applicant: Capital One Services, LLC, McLean, VA (US)

(72) Inventors: Jason Wittenbach, Falls Church, VA (US); James O. H. Montgomery, McLean, VA (US); Christopher Bayan Bruss, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/011,839

(22) Filed: Sep. 3, 2020

(65) Prior Publication Data

US 2022/0067737 A1  Mar. 3, 2022

(51) Int. Cl.
| | | |
|---|---|---|
| *G06Q 20/40* | (2012.01) | |
| *G06F 17/18* | (2006.01) | |
| *G06N 20/00* | (2019.01) | |
| *G06N 3/047* | (2023.01) | |
| *H04L 9/40* | (2022.01) | |

(52) U.S. Cl.
CPC ......... *G06Q 20/4016* (2013.01); *G06F 17/18* (2013.01); *G06N 3/047* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 11,039,138 B1* | 6/2021 | Xu .................... | H04N 19/13 |
| 2017/0116519 A1 | 4/2017 | Johnson et al. | |
| 2018/0165554 A1 | 6/2018 | Zhang et al. | |
| 2018/0240031 A1* | 8/2018 | Huszar ............. | G06N 3/045 |
| 2019/0086988 A1 | 3/2019 | He et al. | |
| 2020/0326667 A1* | 10/2020 | Ahuja ............. | G06N 3/08 |
| 2021/0061471 A1* | 3/2021 | Bates ............. | G06Q 30/0255 |

OTHER PUBLICATIONS

De Sousa Ribeiro, Fabio et al., "Deep Bayesian Self-Training", arXiv:1812.01681v3 [cs.CV], Jul. 17, 2019, pp. 1-18, Available online at "https://arxiv.org/pdf/1812.01681v3.pdf".

* cited by examiner

*Primary Examiner* — Bruce I Ebersman
*Assistant Examiner* — Bhavin D Shah
(74) *Attorney, Agent, or Firm* — Sterne, Kessler, Goldstein & Fox P.L.L.C.

(57) ABSTRACT

Systems and methods are disclosed herein for improving machine learning of a data set. In one example, the method may include training a predictive model on an initial data set comprising labeled data, wherein the training is performed in an active learning system. The method may further include generating a set of parameters based on the training and introducing an unlabeled data set into the predictive model. According to some embodiments, the method may further include applying the set of parameters to the unlabeled data set, generating a set of predictions associated with the applied set of parameters and calculating a first uncertainty score and a second uncertainty score associated with the generated set of predictions. Moreover, the method may also include modifying the data set based on the first uncertainty score, and modifying the predictive model based on the second uncertainty score.

16 Claims, 6 Drawing Sheets

SYSTEMS AND METHOD FOR ENHANCED ACTIVE MACHINE LEARNING THROUGH PROCESSING OF PARTITIONED UNCERTAINTY

BACKGROUND

Machine learning (ML) is the scientific study of algorithms and statistical models that computer systems use to perform a specific task without using explicit instructions, relying on patterns and inference instead. It is seen as a subset of artificial intelligence. Machine learning algorithms build a mathematical model based on sample data, known as "training data", in order to make predictions or decisions without being explicitly programmed to perform the task. Machine learning algorithms may be used in a wide variety of applications, such as email filtering, computer vision, fraud detection, and the like.

In order to handle the vast quantities of data that must be processed in today's automated environments, data scientists and analysts turn to machine learning to expand processing capacity. Machine learning can construct a predictive model using artificial neural networks (ANNs) that process the training data and produce predictive outputs (predictions). In doing so, ANNs mimic biological process by using labeled initial data to "learn" what labels to associate with subsequent inputs.

In some instances, the predicted output may include one or more uncertainties associated with the model, the information collection process, the type of information collected, the information size or dimensionality, the information processing, and the like. However, predictive models typically do not account for these uncertainties, and operators/scientists cannot always determine how to calculate these uncertainties, or how they affect the predicted output. Models that do predict uncertainty often focus on only a single source of uncertainty which does not provide users a holistic picture of the modelling problem.

DETAILED DESCRIPTION

To solve the existing problems in the art, embodiments of the present disclosure deploy a predictive model that accounts for model based and data based uncertainties that can subsequently alert an operator and/or self-adjust in order to minimize uncertainties in the output prediction and/or intelligently deal with high uncertainties in a well-informed manner. This can increase predictive accuracy, provide business critical information about the expected error in a prediction, and provide operators an awareness of potential model bugs.

Examples of applications for the below methods, media, and systems are numerous, but a few are given here merely to indicate possible uses. Other applications will be readily apparent to one of skill in the relevant arts and are likewise contemplated by this disclosure. Moreover, description of "an embodiment" or "one embodiment" should not be construed as limiting the scope of the disclosure, as elements, sub-elements and features of a given embodiment may also be used in other embodiments of the disclosure. While methods described herein may have steps described in a specified order, it will be understood that some of those steps may be re-arranged or performed in a different order. Additionally, embodiments may be given describing applications to particular industries or commercial fields, but scope of the disclosure is not so limited.

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

Figure 1:
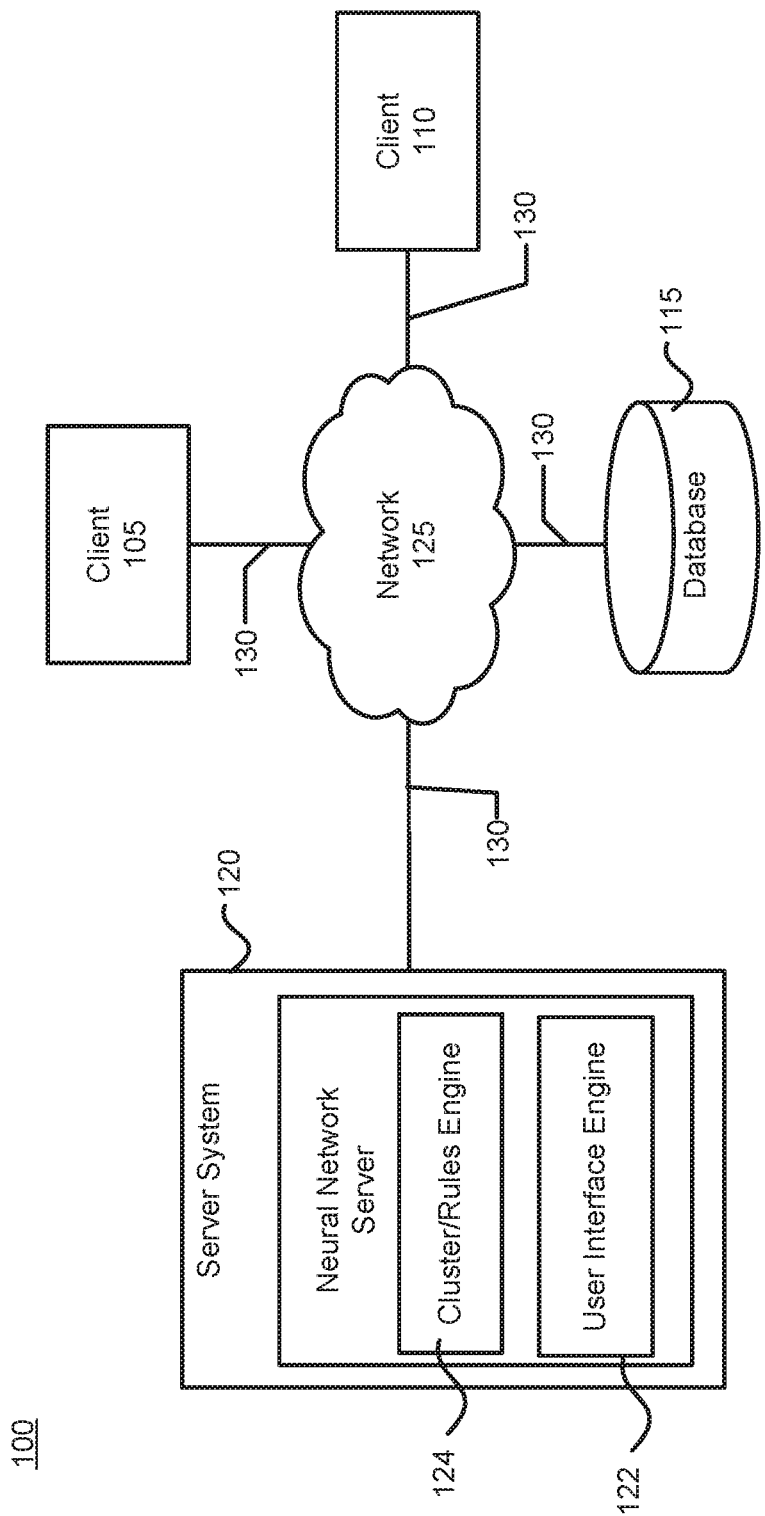
FIG. 1 is a simplified block diagram of a distributed computer network incorporating a specific embodiment of a system for distributed monitoring, evaluation, and response for multiple devices, user accounts, user data, sensor data, and the like, using the described machine learning techniques, according to some embodiments.

FIG. 1 is a simplified block diagram of a distributed computer network 100 of a system for monitoring, evaluating, and responding to multiple devices, user accounts, user data, sensor data, and the like, using the below-described machine learning techniques, according to some embodiments. Computer network 100 may include a number of client systems 105 and 110, a database 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwired links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, and 110 may be coupled to communication network 125 via an access provider (not shown) or via some other server system.

Client systems 105 and 110 typically request information from a server system which provides the information. Server systems by definition typically have more computing and storage capacity than client systems. However, a particular computer system may act as both a client or a server depending on whether the computer system is requesting or providing information. Aspects of the system may be embodied using a client-server environment or a cloud computing environment.

In one example, server system 120 receives information requests from client systems 105 and 110, performs processing required to satisfy the requests, and forwards the results corresponding to the requests back to the requesting client system. This may include performing an initial labeling of an initial data set for training purposes. Accordingly, client systems 105/110 may request that server system 120 process an initial data set to generate a predictive model. This may entail that client system 105/110 provide the initial data set, or in the alternative, that server system 120 retrieves the initial data set from database 115. One of ordinary skill in the art would appreciate that the initial data set may also be initially stored or downloaded and stored by server system 120. Generating the predictive model may initially include labeling of unlabeled data using client systems 105/110, either through an embedded algorithm at client systems 105/110, or through an interaction between data scientists using client systems 105/110 and server system 120. For example, a data scientist using one of client systems 105/110 may connect to server system 120 through the system's user interface engine 122. General principles of labeling and training of neural networks are known in the art, for example, as described in Huzar et al., U.S. Pat. Pub. No. 2018/0240031, which is incorporated herein by reference in its entirety.

The processing required to satisfy the request may be performed by server system 120 or may alternatively be delegated to other servers connected to communication network 125. In another example, server system 120 may request information from client devices 105/110 to provide feed data for labeling and to enrich its predictive model as will be further described herein.

Client systems 105/110 enable users/data scientists to access and query information or applications stored by server system 120. A client system may be a computing device. Some example client systems include desktop computers, portable electronic devices (e.g., mobile communications devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In a specific embodiment, a "web browser" application executing on a client system enables users to select, access, retrieve, or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

In another embodiment, server system 120 may also monitor the activities of client systems 105/110 and identify security breaches or alerts that are triggered by irregular activities or activities tracked and sent to the server by network monitoring devices (not shown), or identify instances of fraud, identify theft, and other financial crime activities. For example, identifying predictions with high uncertainty related to lack of training data may indicate the presence of synthetically generated data common to first person fraud cases. Identifying such a case requires not only estimating uncertainty but also identifying that the source of uncertainty is the lack of similar training data. Generating new synthetic data is a known strategy employed by fraudulent users to circumvent existing models that make predictions without taking into account prediction uncertainty. As another example, legitimate customers may make transactions that are similar to the purchase behavior of a fraudulent user. A model that is not sensitive to uncertainties might predict that these transactions are fraudulent resulting in adverse outcomes for the legitimate customer. However, a model sensitive to uncertainty may predict that the transactions are fraudulent but also display a high uncertainty in that prediction. A human can use this additional information to make more informed judgement calls about how to treat the case of potential fraud.

An active learning system can build on machine learning models by augmenting a model with an algorithm that allows it to request additional labels from unlabeled data. Bayesian neural networks offer a principled approach to active learning. According to some embodiments, flexibility provided by a neural network may be complemented with the uncertainty measurement provided by the Bayesian network. By providing a flexible model for prediction, and combining it with a quantification of the model's uncertainty in a prediction, the model's prediction accuracy is enhanced. From this, the uncertainty may be decomposed into partitions based on two or more of epistemic uncertainty, aleatoric uncertainty, and out of sample uncertainty. Epistemic uncertainty is the scientific uncertainty in the model parameters used to predict the process of interest. It is due to limited data and knowledge. In other words, epistemic uncertainty may be thought of as being driven by the training data not being sufficient to constrain the model's prediction. Aleatoric uncertainty refers to the inherent uncertainty due to the probabilistic variability. In other words, aleatoric uncertainty may be thought of as being driven by intrinsic uncertainty in the data—i.e. similar inputs being associated with different outputs. Accordingly, when epistemic uncertainty is high, server system 120 may determine that such inputs are good candidates for submission for manual labeling and transmits the inputs to devices 105/110 for a scientist to perform manual labeling. After labeling, the inputs are sent back to server system 120 to be included in future training datasets which will help constrain the model when making predictions on similar data. When aleatoric uncertainty is high, increasing accuracy will be possible by designing/measuring new features as will be further described herein. Out of sample uncertainty is the uncertainty that comes from trying to make a prediction on a sample dissimilar to any sample in the training data. According to some embodiments, epistemic uncertainty may be used as a proxy for out of sample uncertainty. The systems described herein may or may not make the assumption that epistemic uncertainty is a proxy for out of sample uncertainty. If epistemic uncertainty is not deemed a suitable proxy for out of sample uncertainty, then a separate model may be used to directly model the out of sample uncertainty in predictions. According to some embodiments, local computing bandwidth considerations may be taken into account when determining which model to implement. For example, if a device providing the predictive model has limited computing capacity, then a single model (e.g., aleatoric/epistemic) may be used. Otherwise, two models may be used. The use of two predictive models can improve the predictive accuracy.

Figure 2:
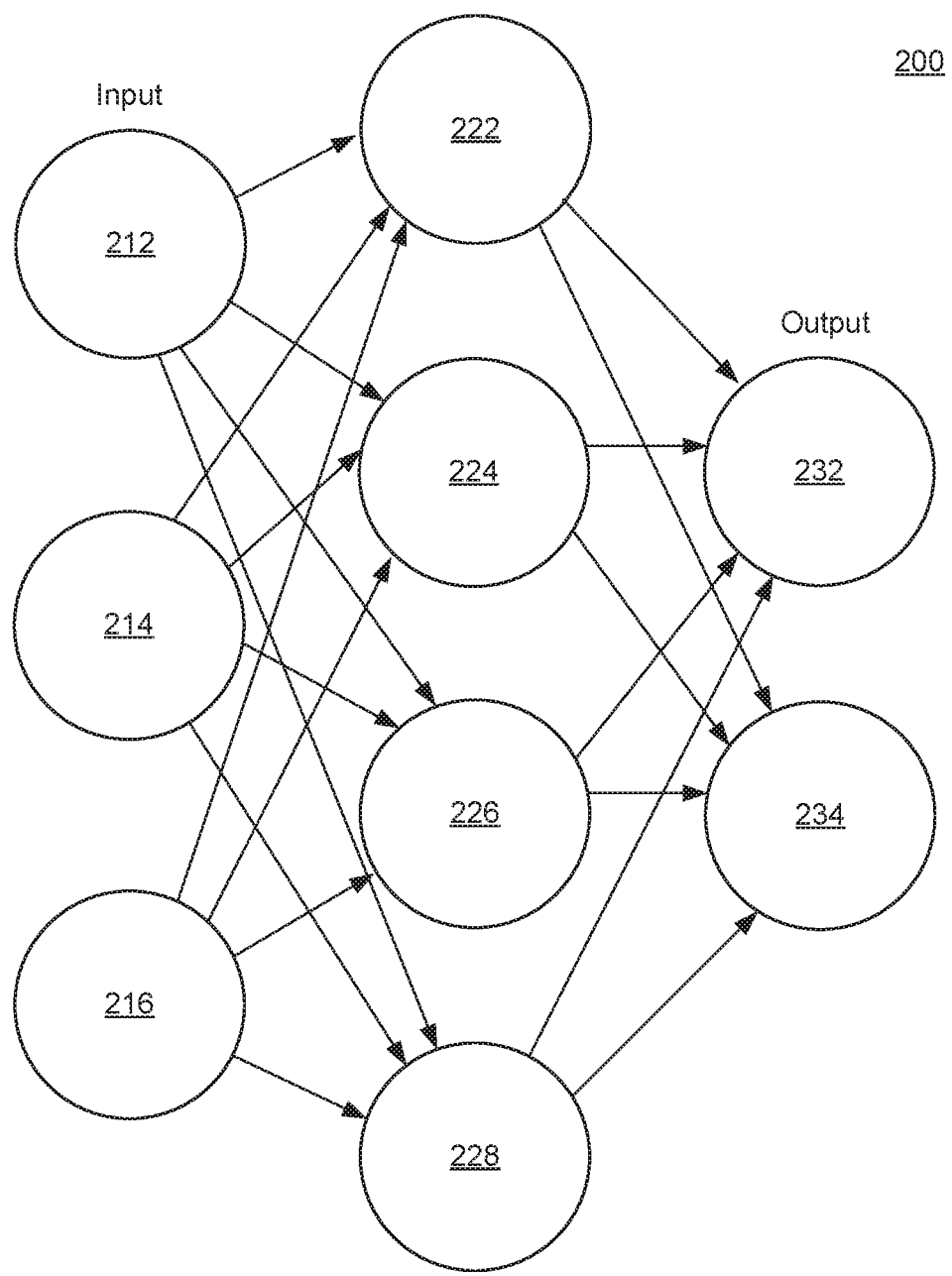
FIG. 2 is a simplified diagram of an artificial neural network, according to some embodiments.

FIG. 2 is a simplified diagram of an artificial neural network 200 for carrying out machine learning in a computing environment such as distributed computer network 100, according to some embodiments. Artificial neural network 200 may be run at server system 120, and specifically, cluster/rules engine 124. Artificial neural network 200 may include three columns of nodes, representing input nodes, intermediary (hidden) nodes, and output nodes, although additional intermediary nodes are possible. Each node represents one or more pieces of data that are to be analyzed or that represents an intermediary step in such analysis. The arrows pointing into or out of the nodes, referred to as edges in an artificial neural network, represent a flow of data into or out of the nodes. Thus, each node has data that flows either into or out from one or more other nodes (or flows both into and out of other nodes in some instances).

It may be understood that an artificial neural network is a system of hardware and software deploying algorithms to perform computation and deep learning which can provide, among other things, predictions. Artificial neural network 200 may be any type of neural network, including, for example, a feedforward neural network, a radial basis function neural network, a multilayer perceptron neural network, a convolutional neural network, and a recurrent neural network. Each type of neural network includes benefits and challenges in implementations depending on the intended purpose, usage and design of the network. One such example of a feedforward neural network is a Bayesian neural network. In a Bayesian neural network, multiple predictions are sampled from the neural network and a probabilistic model is taken for each new input. In other words, multiple samples of the outputs are produced for each new input. Each of those samples will look like a percentage or a likelihood of the categorization that is taking place. As an example, a Bayesian neural network could draw 100 different samples, where the first sample returns a 75 percent likelihood of a particular result, the second sample gives an 80 percent likelihood, the next sample produces a 52 percent likelihood, and so forth. This would continue until the 100 samples are completed, giving 100 probabilities with which to determine a certain outcome.

As shown in FIG. 2, artificial neural network 200 is depicted with three input nodes 212, 214, and 216 in the first column. Because nodes 212, 214, and 216 are the initial inputs of the system, there is no information shown flowing into any of these nodes. However, each of nodes 212, 214, and 216 are depicted as an input into the next column of nodes in the network. The data from input nodes 212, 214, and 216 is shown flowing into each of intermediary hidden nodes 222, 224, 226, and 228, which appear in the center column of FIG. 2. Data from input node 214 flows into intermediary hidden nodes 222, 224, 226, and 228. Similarly, data from each of input nodes 212 and 216 flows into intermediary hidden nodes 222, 224, 226, and 228. This represents the samples for the different inputs into network 200.

In one example, one or more of the layers of the neural network 200 that generate an output from a received input in accordance with current values of a set of parameters are Bayesian neural network layers. A Bayesian neural network layer is a layer for which each parameter is associated with data representing a probability distribution over the possible values of the parameter. That is, rather than maintaining current values for the parameters of the Bayesian neural network layers, neural network 200 maintains data representing probability distributions for each parameter of each Bayesian neural network layer, e.g., in a probability distribution data repository (e.g., database 115 or a memory within server system 120). In particular, as will be described in more detail below, the probability distribution data repository stores, for each parameter of each Bayesian neural network layer, the parameters of an approximation of the probability distribution for the parameters.

According to some aspects, the input features interact with each other through adjacent relationships, like layers of less complex predictive models overlaid in linear combinations. This may include, for example, all of the input features, or some of the input features. Generally, a Bayesian neural network has a large number of parameters. Those parameters are treated as random variables rather than as fixed numbers, because of the repeated sampling of the inputs. When training the model, a specific single value is not learned for the parameter, but rather a distribution over the possible values that the parameter can take is determined. A parameter might have a Gaussian/bell shaped distribution, with the majority of the samples falling around some average value, e.g., either plus or minus five standard deviations from the average. This distribution can be fit through a variety of inferential techniques including but not limited to markov chain monte carlo (MCMC), variational inference (VI), and Lagrange approximations familiar to those skilled in the art. These techniques solve complex numerical problems through estimation to provide a distribution over likely model parameters. The numeric problems that are solved are created by defining a prior and likelihood distribution that collectively represent the information of the model builder and the training data. The epistemic uncertainty of a prediction can be derived by repeatedly sampling the distribution of the model parameters and making predictions. Each sample from the model parameters represents a potential model that could be used to describe the mean of the data process. The model could also predict the uncertainty inherent in the data process, previously referred to as aleatoric uncertainty. In this way one model would predict both epistemic and aleatoric uncertainty. Predicting the aleatoric uncertainty will be further described herein.

In one example, when averaging the output of those samples, the result of that calculation is itself a probability. Breaking down the parts of the uncertainty in the calculation requires computing the entropy of the results, which effectively instructs on how to quantify the uncertainty. For example, in the case of binary prediction, if uncertainty in the calculation is "50/50", entropy is highest, because it is completely uncertain. On the other hand, if that uncertainty is 0/100 or 100/0, entropy is 0 (i.e., the prediction is completely certain). The entropy of the average prediction, which is a probability over multiple outcomes, estimates aleatoric uncertainty. On the other hand, taking the entropy of each of the predictions and averaging those values estimates epistemic uncertainty. These particular calculations are merely examples, therefore other methods of calculation are possible and within the scope of the application.

The outputs that are possible, which are represented in FIG. 2 as output nodes 232 and 234, represent a decisioning process within the artificial network. As shown in FIG. 2 with output nodes 232 and 234, the outputs can be a binary, yes/no type of output. This is merely an example and is not so limited. Other embodiments of artificial neural network can have more possible outputs because more labels from a larger set of labels are possible. In one example, in image processing and reproduction, the outputs can be the likelihood that a particular pixel is red, green or blue in an RGB display system. In another embodiment, cyan, magenta, yellow, or black in a CMYK printed image context can be outputs for decisioning. Again, these three and four output decisions are merely examples. An even greater number of outputs may be possible.

As mentioned above, the input nodes result in a probability distribution for the inputs with this type of modeling. The results can be a histogram against all the possible probability scores that could be expected. Using that histogram, in the example of FIG. 2, if more samples result in the output being judged a "yes", then the output node is a yes which can be given as output node 232. In contrast, if more samples result in the output probabilistically being a "no", then the opposite output is given by output node 234. The use of the histogram by the user is only limited to the uses of the probability distribution it approximates and should not be limited to the "yes/no" example above.

As a further example, in a system with a large number of transactions, artificial neural network 200 can be a machine-learned system to check the validity of those transactions. Input nodes 212, 214, and 216 are various transactions that must be monitored for validity. Output nodes 232 and 234 can be the decision as to whether the inputs are valid transactions. Intermediary nodes 222, 224, 226, and 228 represent the computation in determining whether those transactions are, in fact, valid transactions.

Artificial neural network 200 is an example for understanding the context of the above and below discussions of the application. It should be understood that additional nodes may be possible in an implementation of the present disclosure. The number of input, intermediary, and/or output nodes would be constrained only by the amount of data entering the system and likewise necessary for output purposes. As such, one of skill in the relevant arts would recognize that a much larger number of input nodes, intermediary nodes and output nodes would be likely in various implementations. The three columns also are shown only as example, as multiple columns of intermediary layers, feeding into one another and representing much more complex computation, are possible. In other words, inputs may go through a number of different analysis steps, rather than simply the one intermediary phase as shown in FIG. 2.

As noted herein, active learning systems build on machine learning models by augmenting the model with an algorithm that allows the active learning systems to request additional labels from unlabeled data. The use of Bayesian neural networks allows for the decomposition of uncertainty in two different ways to get an aleatoric and an epistemic uncertainty of the predictive model, the combination of which can lead to decisions that can help improve the performance of the model and layer better judgement on the use of model outputs. For example, a predictive model may be trained on an initial labeled data set. As new unlabeled data comes in, epistemic uncertainty scores are computed and collected.

Human experts can be assigned to label the data points with the highest epistemic uncertainty scores. Simultaneously, data points with high aleatoric uncertainty in the training data can be reviewed by data scientists and new features or data collection processes can be engineered that increase accuracy on these data points. These data points and features can then be computed and added to the training set, and the model can again be refit. If data points with high out of sample uncertainty are identified, it may alert modelers that the training dataset was not collectively exhaustive allowing for data collection where the model was previously blind. Identification of the source of uncertainty allows for more efficient treatment of the uncertainty by the human-in-the-loop component. For example, aleatoric data will not decrease through the collection of more data, but requires changes to the data collection process itself. Identifying that an uncertainty is of an aleatoric nature allows humans to not only diagnose sources of uncertainty, but to also treat them properly.

Figure 3:
FIG. 3 is a flowchart representing a method of improving machine learning of a data set, according to some embodiments.

FIG. 3 is a flowchart representing a method 300 of improving machine learning of a data set as would be performed by a device such as server system 120 in network 100, according to some embodiments. Method 300 may include training a predictive model on an initial data set comprising labeled data 302, generating a set of parameters based on the training 304, introducing an unlabeled data set into the predictive model 306, applying the set of parameters to the unlabeled data set 308, generating a set of predictions associated with the applied set of parameters 310, calculating a first uncertainty score and a second uncertainty score 312, and performing a modification based on the calculating step. The modification may be modifying the data set based on the first uncertainty score 314, and/or modifying the predictive model based on the second uncertainty score 316. For example, the exercise of modeling the risk of an entity defaulting on a loan may require fitting a model to an initial dataset comprised of A) labels indicating default and B) characteristics of the entity used as features in the model. A model would be fit to this data using any of a variety of inferential techniques and verified using validation procedures commonly used by experts in the field. Inferential techniques may include, but are not limited to, MCMC, VI, and Lagrange approximation. Validation procedures may include, but are not limited to, leave one out (LOO) and cross validation (CV). The model may then be used to predict A) if an entity will default B) the uncertainty inherent in the data (aleatoric) C) the uncertainty in the model parameters (epistemic) and D) the uncertainty given the similarity of the new sample to the training samples (out of sample). The model users may modify the model or model outputs using one or all of this information. For example, the model user may choose to ignore predictions with high epistemic uncertainty until sufficient data is collected to refit the model to make more certain predictions. These decisions could be made in batches (i.e. groups of 100 at a time) or in real time. The model user may use the model outputs as inputs to other models, algorithms, or score cards to help inform such decisions.

Aspects of the present disclosure provide solutions that improve the active learning process of the neural network by relying on partitioned uncertainties of the predictions and determining levels of confidence of those predictions. In some embodiments described herein, the labeling may be enhanced when it is determined that uncertainty in the data is sufficiently high to warrant additional labeling being performed by a data scientist for example. Moreover, the active learning process may be further enhanced in situations where the inherent uncertainties in the model itself are sufficiently high and would require an adjustment of the model itself or the data collection process of training samples. Embodiments and examples of these methods are further described herein.

As noted herein, after training is performed, a set of predictions associated with the applied set of parameters may be generated. This may be done by using a sampling method where a number of samples are drawn and probabilities with which a certain outcome is determined are calculated. As an example, a Bayesian neural network could draw 100 different samples for a prediction, where the first sample returns a 75 percent probability of a particular result, the second sample gives an 80 percent probability, the next sample produces a 52 percent probability, and so forth. This would continue until the 100 samples are completed, giving 100 probabilities with which to determine a certain outcome/prediction. The probability of each individual sample may represent an estimate of aleatoric uncertainty. The distribution across all 100 samples may represent the epistemic uncertainty. The 100 samples would as such represent a probability distribution of probability distributions. According to some aspects, the epistemic uncertainty alone may yield a posterior distribution in the Bayesian statistical model. The posterior and/or posterior predictive uncertainties can be used in a variety of ways such as traditional estimation/prediction, decision theoretic uses, and/or reinforcement learning. Accordingly, generating the set of sampled predictions may include generating a probabilistic distribution of possible values for each parameter (epistemic uncertainty), where the true value describing the process that generated the training data often being assumed to be the most probable value within the probabilistic distribution.

After the set of predictions is generated, server system 120 may calculate the uncertainties associated with the predictions to determine if the operation is to continue, or whether corrective measures need to take place (and the nature of the corrective measures). In this regard, server system 120 may calculate the epistemic and aleatoric uncertainties of the model.

Figure 4:
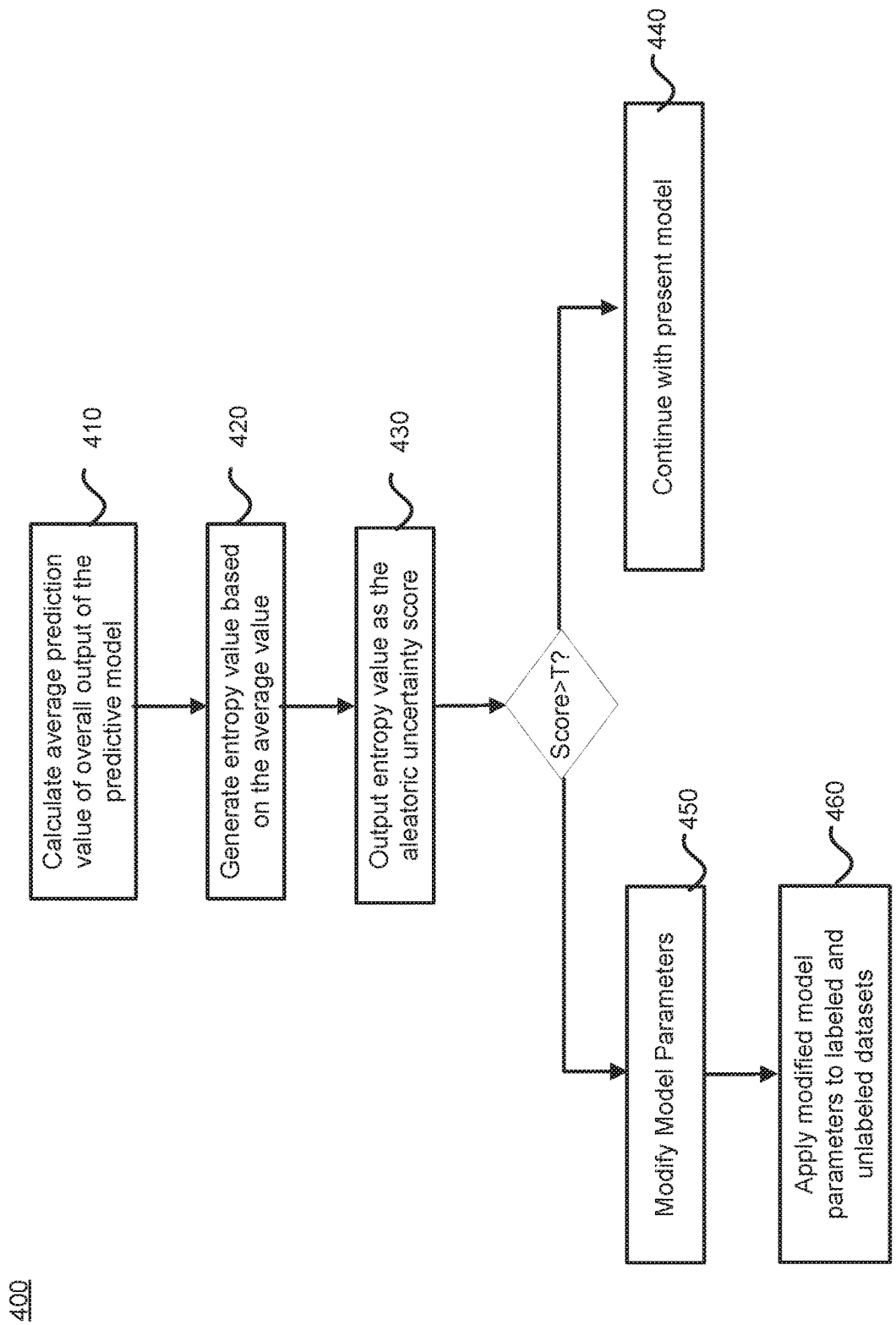
FIG. 4 is a flowchart representing a decisioning method based on a first uncertainty score, according to some embodiments.

An example calculation of the aleatoric uncertainty is described further herein and illustrated in FIG. 4. In calculating the aleatoric uncertainty (may also be referred to as the aleatoric uncertainty score), server system 120 may calculate an average prediction value of an overall output of the predictive model 410, the overall output including a prediction for each parameter of the set of parameters for example. Then, server system 120 may generate an entropy value based on the average value 420 and output the entropy value as the aleatoric uncertainty score 430. If the aleatoric uncertainty score is determined to be below a threshold, then server system 120 may continue to perform the predictive model 440. Alternatively, if the aleatoric uncertainty score is determined to be above the threshold, then server system 120 may need to perform a modification of the generated parameters in order to modify the model itself. As noted herein, the aleatoric uncertainty reflects inherent issues with the model itself and a modification of the model may be required if the uncertainty score is above a threshold value. Moreover, once the parameters are modified, server system 120 may then apply the modified parameters to both labeled and unlabeled datasets. This is because the predictive model may need to be trained after the parameters are modified.

Figure 5:
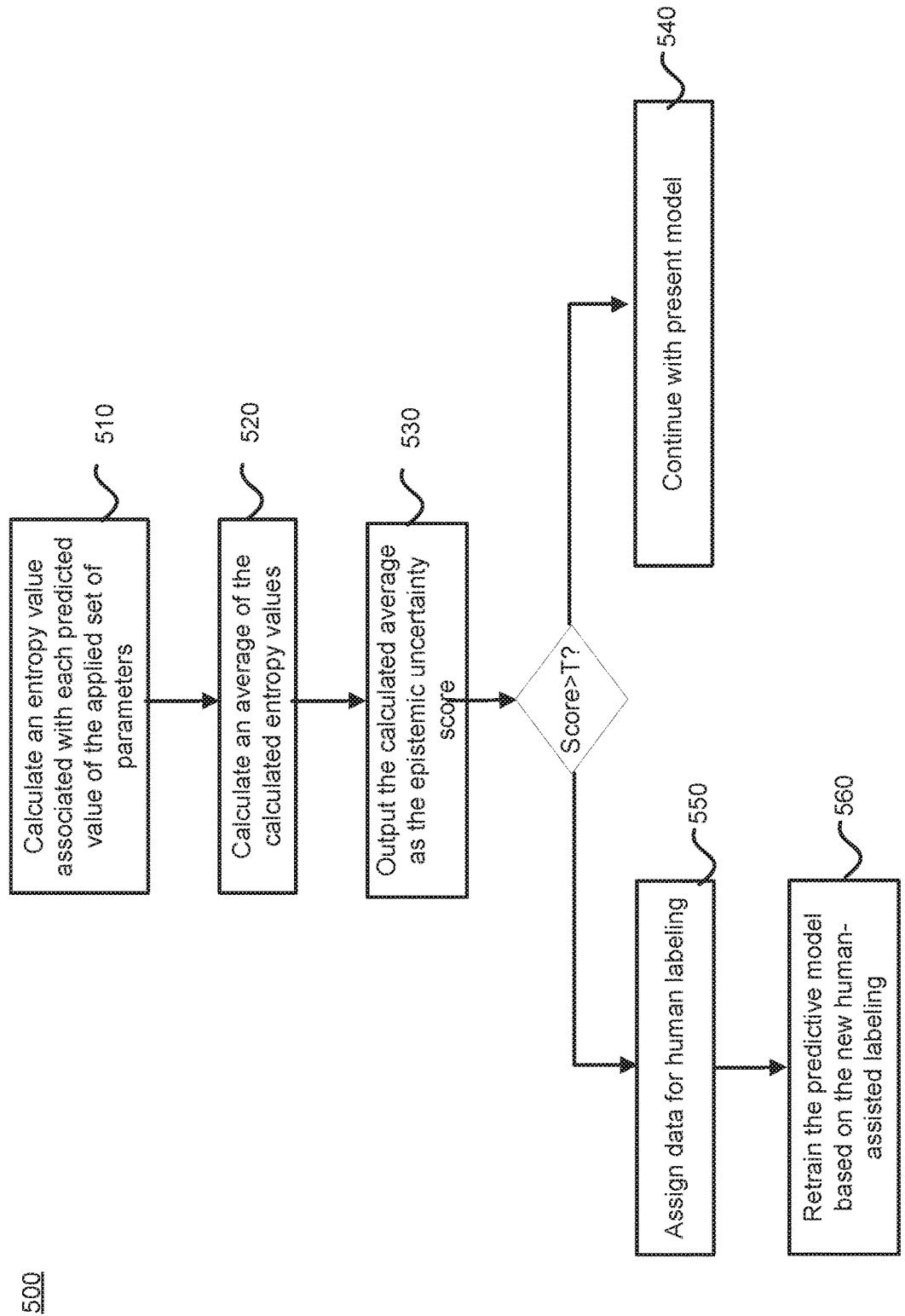
FIG. 5 is a flowchart representing a decisioning method based on a second uncertainty score, according to some embodiments.

An example calculation of the epistemic uncertainty score is described herein and illustrated further in FIG. 5. In calculating an epistemic uncertainty score, server system 120 may calculate an entropy value associated with each predicted value of the applied set of parameters 510. Then server system 120 may calculate an average of the calculated entropy values 520 and output the calculated average as the epistemic uncertainty score 530. If the epistemic uncertainty score is below a threshold, then server system 120 may continue to perform the prediction calculation 540. On the other hand, if the epistemic uncertainty score is above the threshold, server system 120 may modify the unlabeled data set by assigning a piece of data for human-assisted labeling responsive to the epistemic uncertainty score. In this regard, server system 120 may send the request for additional labeling to clients 105/110 for further labeling based on corrected prediction information 550. Moreover, server system 120 may then retrain the predictive model, using the human-assisted labeling, where the retraining is performed with a remainder of the unlabeled data set 560.

The following example demonstrates the potential application of the proposed solutions of the present disclosure. According to some embodiments, an enterprise may deploy a predictive model that provides business critical decisions. While every predictive model may have strengths and weaknesses, it is important for the enterprise to know what these weaknesses are when they occur, and how they can be alleviated. This is especially critical for predictive models that are involved in real-time applications, like, for example, driverless automotive decision making, fraud detection as discussed herein, and the like. According to aspects of the present disclosure, two machine learning approaches may be combined, e.g., neural networks and Bayesian statistical modeling, in a practical design, where human agents, such as quality assurance agents, or agents dealing with live customers, can use outputs of the model to quickly identify any issues in the predictions, and how to best address them. According to some aspects, combining the epistemic uncertainty and aleatoric uncertainty allows the predictive model to be smarter, self-correcting and more intuitive. For example, knowing the sufficiency of the training data and the inherent uncertainties in the probabilistic variables enables the model, and subsequently, operators, to address any potential deficiencies, as will be further discussed in the following example.

In one example, the initial data set may be related to financial information associated with a decisioning process for financial institutions. Here, the decisioning process may include fraud detection, decisions relating to fraud, and/or money laundering decisions as discussed herein. A fraud alert may be issued by, e.g., server system 120 to one or more remote devices. The fraud alert may be issued in response to an output of the predictive model being above the predetermined threshold. For example, using an application on clients 105/110, a potential customer/user may be asked to provide a photograph of government identification to verify the identity of the potential customer/user. A model may be used to predict the validity of the identification in the photograph using the photograph itself or derived features as input. According to some aspects, the model may predict two or more of A) the validity of the identification, B) the aleatoric uncertainty from the data (i.e. stemming from the grain of the photo or lighting conditions in which the photo was taken), C) the epistemic uncertainty from the model (i.e. relating to the number of training samples with similar characteristics), and D) the out of sample uncertainty (i.e. whether any training examples exist with that form of identification).

According to some aspects, the type of fraud alert issued in response to the model predictions may differ. For example, a prediction of fraud with low uncertainty may result in notification of the authorities. A prediction with high aleatoric uncertainty may prompt the potential customer to send a higher quality photo. This may be done, for example, through the application on clients 105/110, where the potential customer would be prompted to provide an image of a higher quality. As noted herein, the aleatoric uncertainty refers to the inherent uncertainty due to the probabilistic variability—i.e., driven by intrinsic uncertainty in the data, and therefore, newer/better data is requested from the potential customer. A prediction with high epistemic uncertainty may prompt a data scientist to add the sample to a future training set to better fit the model. As noted herein, the epistemic uncertainty is the scientific uncertainty in the model parameters used to predict the process of interest and is due to limited data and/or knowledge. In other words, where the training data is deemed insufficient. Accordingly, it is beneficial to prompt a data scientist to add the sample to a future training set to better fit the model. A prediction of high out of sample uncertainty may prompt further scrutiny from an internal fraud agent trained to deal with more difficult cases of potential fraud or an alert may be sent prompting the potential customer to submit a different form of identification. This is because out of sample uncertainty relates to attempting to make a prediction on a sample that is dissimilar to any sample in the training data. Accordingly, further scrutiny may be required.

Figure 6:
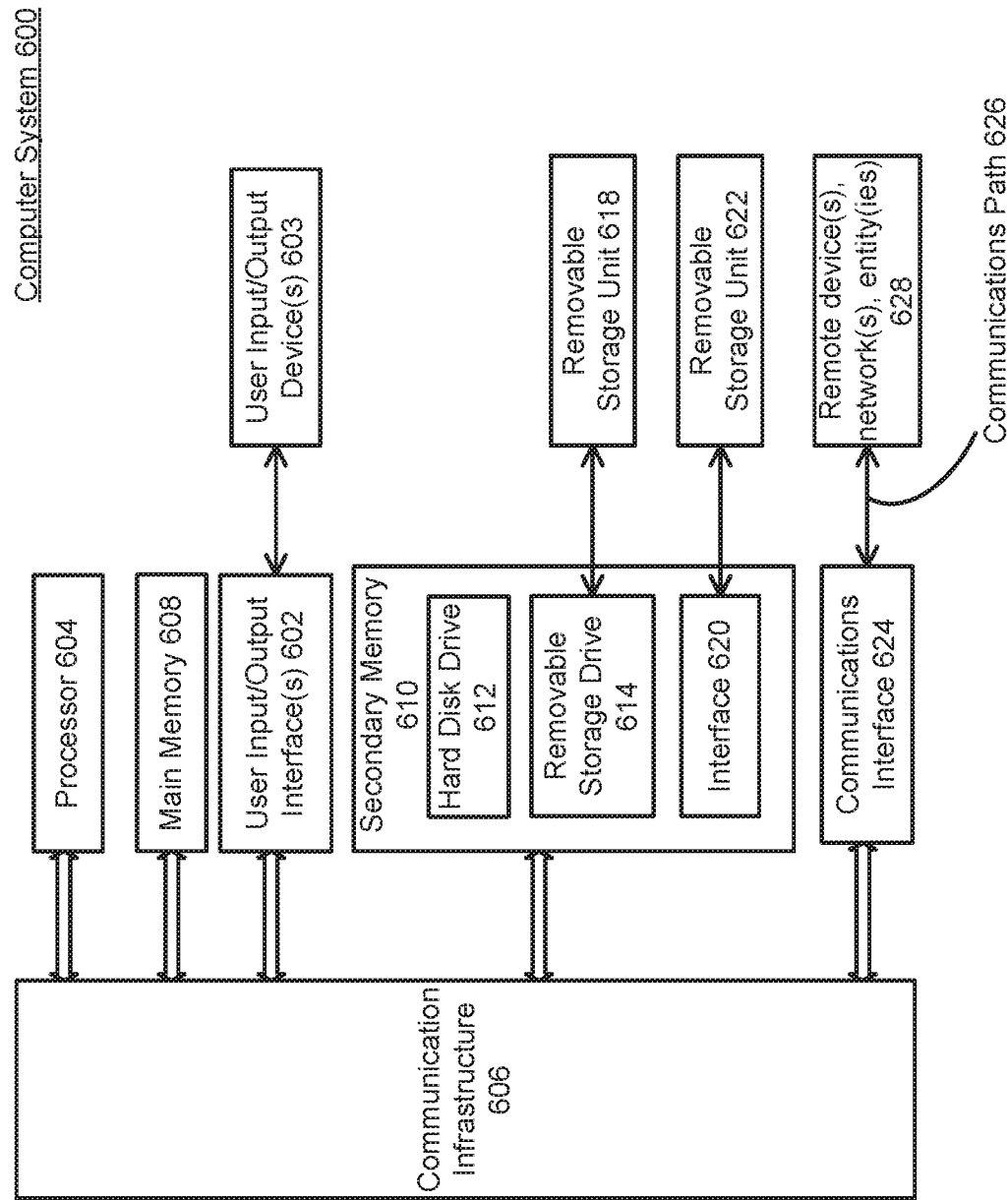
FIG. 6 illustrates a computer system that carries out the machine learning and decisioning operations in FIGS. 2-5, according to some embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random-access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system embodiments other than those described herein.

Various embodiments of the present disclosure determined partitioned uncertainty scores using different methods to determine the performance of the predictive model. Based on uncertainty results, the system may modify the model itself or may rely on manual update of labeling for continued active learning within the model. This improves the performance and accuracy of the model by allowing for continued monitoring and adjustment of the model using additional labeling and/or model adjustment. Moreover, this enables a processing device, such as server 120, to review and label a small portion of transactions/unlabeled data for training purposes because the solutions advocated herein allow for more accurate adaptive and active learning model. A use case has been provided above where transaction validity is monitored by the machine-learned process. However, other examples are contemplated within the scope of the application as seen through other embodiments of the disclosure. As one example, the above systems, media and methods can be used by a financial institution in an effort to detect money laundering. While a large number of transactions must be monitored in order to detect those that relate back to nefarious purposes, manual classification of each transaction is not possible and can be aided by machine-learned predictive models. Another example of data-intensive decisioning comes from credit determination applications. The ability to monitor large volumes of transactions across multiple credit-rating agencies internally at a financial institution would allow for computer-aided determinations for credit lines and products. Moreover, additional embodiments are possible in non-financial settings, such as medical diagnostics, life sciences research, image reproduction and processing, and voice/speech recognition applications.

Descriptions to an embodiment contemplate various combinations, components and sub-components. However, it will be understood that other combinations of the components and sub-components may be possible while still accomplishing the various aims of the present application. As such, the described embodiments are merely examples, of which there may be additional examples falling within the same scope of the disclosure.

What is claimed is:

1. A computer-implemented method for preventing a fraudulent transaction, the method comprising:
   providing, by a processor of a computing device, to a predictive model trained to identify fraudulent activities and fraudulent users associated with transactions, transaction data that indicates a pending transaction, wherein the predictive model has previously been trained to identify the fraudulent activities and the fraudulent users associated with the transactions via a training method comprising:
      training the predictive model on an initial data set comprising labeled data indicating at least one of a first fraudulent activity associated with a first transaction or a first fraudulent user associated with the first transaction;
   generating a set of parameters based on the training;
   introducing an unlabeled data set for a second transaction into the predictive model;
   applying the set of parameters to the unlabeled data set;
   generating a set of predictions associated with the applied set of parameters;
   calculating an aleatoric uncertainty score and an epistemic uncertainty score associated with the generated set of predictions,
   wherein calculating the aleatoric uncertainty score comprises:
      for each parameter of the applied set of parameters:
         generating, based on an iterative input of the parameter into the predictive model, a respective probabilistic distribution of values; and
         selecting, from the respective probabilistic distribution of values, a respective predictive value;
      calculating, based on an average value of the selected respective predictive values for each parameter of the applied set of parameters, an average prediction value for an overall output of the predictive model;
      calculating, based on the average prediction value for the overall output of the predictive model, an amount of entropy for the average prediction value; and
      outputting a value indicative of the amount of entropy for the average prediction value as the aleatoric uncertainty score;
   wherein calculating the epistemic uncertainty score comprises:
      calculating an entropy value associated with each predicted value of the applied set of parameters;
      calculating an average of the calculated entropy values; and
      outputting the calculated average as the epistemic uncertainty score;
   modifying at least one of the initial data set or the unlabeled data set based on the aleatoric uncertainty score; and
   modifying the predictive model based on the epistemic uncertainty score;
   receiving, from the predictive model based on the transaction data, an indication that at least one of information used for the pending transaction is fraudulent information or a user associated with the pending transaction is a fraudulent user; and
   sending, to a device associated with the pending transaction, a notification that causes the pending transaction to be prevented.

2. The computer-implemented method of claim 1, wherein the selected respective predictive values for each parameter of the applied set of parameters is a highest value within the respective probabilistic distribution of values.

3. The computer-implemented method of claim 1, wherein the training method further comprises:
   modifying the generated set of parameters in response to the first uncertainty score being above a predetermined threshold.

4. The computer-implemented method of claim 3, wherein the training method further comprises retraining the predictive model based on the modified generated set of parameters.

5. The computer-implemented method of claim 1, wherein the training the predictive model further comprises:
    modifying the unlabeled data set by assigning a piece of data for human-assisted labeling responsive to the epistemic uncertainty score exceeding a specified threshold.

6. The computer-implemented method of claim 5, wherein the training method further comprises:
    retraining, based on the human-assisted labeling, the predictive model, wherein the retraining is performed with a remainder of the unlabeled data set.

7. The computer-implemented method of claim 1, wherein the epistemic uncertainty score is an out-of-sample uncertainty score.

8. The computer-implemented method of claim 1, wherein training the predictive model is performed using Bayesian neural networks.

9. The computer-implemented method of claim 1, wherein:
    the initial data set is financial information associated with a decisioning process for a financial institution.

10. A non-transitory computer-readable medium having instructions stored thereon that, when executed by at least one computing device, cause the at least one computing device to perform operations for preventing a fraudulent transaction, the operations comprising:
    providing, to a predictive model trained to identify fraudulent activities and fraudulent users associated with transactions, transaction data that indicates a pending transaction, wherein the predictive model has previously been trained to identify the fraudulent activities and the fraudulent users associated with the transactions via training operations comprising:
        training the predictive model on an initial data set comprising labeled data indicating at least one of a first fraudulent activity associated with a first transaction or a first fraudulent user associated with the first transaction;
        generating a set of parameters based on the training;
        introducing an unlabeled data set for a second transaction into the predictive model;
        applying the set of parameters to the unlabeled data set;
        generating a set of predictions associated with the applied set of parameters;
        calculating an aleatoric uncertainty score and an epistemic second uncertainty score associated with the generated set of predictions,
        wherein calculating the aleatoric uncertainty score comprises:
            for each parameter of the applied set of parameters:
                generating, based on an iterative input of the parameter into the predictive model, a respective probabilistic distribution of values; and
                selecting, from the respective probabilistic distribution of values, a respective predictive value;
            calculating, based on an average value of the selected respective predictive values for each parameter of the applied set of parameters, an average prediction value for an overall output of the predictive model;
            calculating, based on the average prediction value for the overall output of the predictive model, an amount of entropy for the average prediction value; and
            outputting a value indicative of the amount of entropy for the average prediction value as the aleatoric uncertainty score;
        wherein calculating the epistemic uncertainty score comprises:
            calculating an entropy value associated with each predicted value of the applied set of parameters;
            calculating an average of the calculated entropy values; and
            outputting the calculated average as the epistemic uncertainty score;
    modifying at least one of the initial data set or the unlabeled data set based on the aleatoric uncertainty score; and
    modifying the predictive model based on the epistemic uncertainty score;
    receiving, from the predictive model based on the transaction data, an indication that at least one of information used for the pending transaction is fraudulent information or a user associated with the pending transaction is a fraudulent user; and
    sending, to a device associated with the pending transaction, a notification that causes the pending transaction to be prevented.

11. The non-transitory computer-readable medium of claim 10, wherein the selected respective predictive value for each parameter of the applied set of parameters is a highest value within the respective probabilistic distribution of values.

12. The non-transitory computer-readable medium of claim 11, the training operations further comprising modifying the generated set of parameters in response to the first uncertainty score being above a predetermined threshold.

13. The non-transitory computer-readable medium of claim 12, the training operations further comprising retraining the predictive model based on the modified generated set of parameters.

14. A system comprising:
    a memory; and
    at least one processor coupled to the memory and configured to perform operations for preventing a fraudulent transaction, the operations comprising:
        providing, to a predictive model trained to identify fraudulent activities and fraudulent users associated with transactions, transaction data that indicates a pending transaction, wherein the predictive model has previously been trained to identify the fraudulent activities and the fraudulent users associated with the transactions via a training method comprising:
            training the predictive model on an initial data set comprising labeled data indicating at least one of a first fraudulent activity associated with a first transaction or a first fraudulent user associated with the first transaction;
            generating a set of parameters based on the training;
            introducing an unlabeled data set into the predictive model;
            applying the set of parameters to the unlabeled data set;
            generating a set of predictions associated with the applied set of parameters;
            calculating an aleatoric uncertainty score and an epistemic uncertainty score associated with the generated set of predictions,
            wherein calculating the aleatoric uncertainty score comprises:
                for each parameter of the applied set of parameters:
                    generating, based on an iterative input of the parameter into the predictive model, a respective probabilistic distribution of values; and selecting, from the respective probabilistic distribution of values, a respective predictive value;

calculating, based on an average value of the selected respective predictive values for each parameter of the applied set of parameters, an average prediction value for an overall output of the predictive model;

calculating, based on the average prediction value for the overall output of the predictive model, an amount of entropy for the average prediction value; and outputting a value indicative of the amount of entropy for the average prediction value as the aleatoric uncertainty score;

wherein calculating the epistemic uncertainty score comprises:

calculating an entropy value associated with each predicted value of the applied set of parameters;

calculating an average of the calculated entropy values; and outputting the calculated average as the epistemic uncertainty score;

modifying at least one of the initial data set or the unlabeled data set based on the aleatoric uncertainty score; and modifying the predictive model based on the epistemic uncertainty score;

receiving, from the predictive model based on the transaction data, an indication that at least one of information used for the pending transaction is fraudulent information or a user associated with the pending transaction is a fraudulent user; and sending, to a device associated with the pending transaction, a notification that causes the pending transaction to be prevented.

15. The system of claim 14, wherein the selected respective predictive values for each parameter of the applied set of parameters is a highest value within the respective probabilistic distribution of values.

16. The system of claim 14, the training method further comprising modifying the generated set of parameters in response to the first uncertainty score being above a predetermined threshold.

* * * * *